(12) United States Patent
Migault et al.

(10) Patent No.: US 11,968,295 B2
(45) Date of Patent: Apr. 23, 2024

(54) ACCESS TO CONTENT OF ENCRYPTED DATA SESSION

(71) Applicants: Telefonaktiebolaget LM Ericsson (publ), Stockholm (SE); Daniel Migault, Montreal (CA); Makan Pourzandi, Montreal (CA)

(72) Inventors: Daniel Migault, Montreal (CA); Makan Pourzandi, Montreal (CA)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 296 days.

(21) Appl. No.: 17/044,755

(22) PCT Filed: Apr. 3, 2018

(86) PCT No.: PCT/IB2018/052298
§ 371 (c)(1),
(2) Date: Oct. 1, 2020

(87) PCT Pub. No.: WO2019/193387
PCT Pub. Date: Oct. 10, 2019

(65) Prior Publication Data
US 2021/0111881 A1    Apr. 15, 2021

(51) Int. Cl.
*H04L 9/08* (2006.01)
(52) U.S. Cl.
CPC ............ *H04L 9/0841* (2013.01); *H04L 9/083* (2013.01); *H04L 9/0891* (2013.01); *H04L 9/0894* (2013.01)
(58) Field of Classification Search
CPC ..... H04L 9/0841; H04L 9/083; H04L 9/0891; H04L 9/0894
See application file for complete search history.

(56) References Cited

U.S. PATENT DOCUMENTS 6,094,485 A     7/2000  Weinstein et al.
10,516,532 B2 * 12/2019 Taub .................... H04L 9/0841
(Continued)

FOREIGN PATENT DOCUMENTS

| CN | 101388060 B | * | 3/2013 | |
| JP | 4226760 B2 | * | 2/2009 | ............. G06F 21/10 |
| WO | WO-2016003858 A1 | * | 1/2016 | ......... H04L 12/4633 |

OTHER PUBLICATIONS

Bob Reselman, Understanding the Essentials of Using an Ephemeral Key under TLS 1.3, 2021 (Year: 2021).*

(Continued)

*Primary Examiner* — Richard A McCoy
(74) *Attorney, Agent, or Firm* — Weisberg I.P. Law, P.A.

(57) ABSTRACT

Methods, terminal and a data center gateway are provided for allowing efficient debugging and troubleshooting of data session encrypted with Perfect Forward Secrecy (PFS) encryption techniques such as for example the Transport Layer Security (TLS) protocol version 1.3. Embodiments of the invention allow the user terminal to authorize a data center gateway to persistently store one or more encryption keys associated with the data session for use to access the recorded data session and troubleshooting it after the session ended, when faults are detected. When a fault is detected, the user terminal provides authorization to the gateway to persistently store the data session along with one or more encryption key(s). With this, the gateway allows for the data session to be later decrypted and faults to be investigated despite the data session being encrypted with PFS techniques.

17 Claims, 6 Drawing Sheets

(56) References Cited

U.S. PATENT DOCUMENTS

| | | | |
|---|---|---|---|
| 11,159,361 B2* | 10/2021 | Small | H04L 41/0654 |
| 2013/0191631 A1* | 7/2013 | Ylonen | H04L 63/1483 |
| | | | 713/153 |
| 2013/0243194 A1* | 9/2013 | Hawkes | H04L 9/0838 |
| | | | 380/270 |
| 2016/0119287 A1 | 4/2016 | Khazan et al. | |
| 2018/0062854 A1 | 3/2018 | Kancharla et al. | |

OTHER PUBLICATIONS

Microprocessor, Multitask Execution Method Using The Same, And Multired Execution Method, Feb. 18, 2009, Clarivate Analytics.*
International Search Report dated Dec. 13, 2018 for International Application No. PCT/IB2018/052298 filed on Apr. 3, 2018, consisting of 11-pages.
Indian Office Action dated Dec. 8, 2021 for Patent Application No. 202017047874, consisting of 5-pages.

* cited by examiner

ACCESS TO CONTENT OF ENCRYPTED DATA SESSION

CROSS-REFERENCE TO RELATED APPLICATIONS

This application is a Submission Under 35 U.S.C. § 371 for U.S. National Stage Patent Application of International Application Number: PCT/IB2018/052298, filed Apr. 3, 2018 entitled "ACCESS TO CONTENT OF ENCRYPTED DATA SESSION," the entirety of which is incorporated herein by reference.

TECHNICAL FIELD

The present invention relates to accessing content of encrypted data sessions for debugging and troubleshooting purposes.

BACKGROUND

TLS (Transport Layer Security) is, according to Wikipedia, a cryptographic protocol that provides communications security over a computer network. Several versions of the protocol find widespread use in applications such as web browsing, email, Internet faxing, instant messaging, and voice over IP (VoIP). Websites, for example, are able to use TLS to secure all communications between their servers and web browsers.

TLS v1.2 and previous versions enabled the use of static Diffie Hellman (DH) or Rivest-Shamir-Adleman (RSA) authentication. But such authentication methods are not fully secured as the knowledge of the secret key enables to decrypt and replay any encrypted communications, once a party has access to the private key. This apparent drawback was useful for cloud service providers as they could record all TLS-encrypted data communications, and with the knowledge of the private key could decrypt these communications for post-session troubleshooting or debugging issues. Hence, with TLS 1.2 for example, debugging is based on the principle that all communications can be decrypted in case troubleshooting or debugging is necessary, even if this happens once the given data communication has ended.

Hence, TLS1.2 is said to enable key exchange agreement based on RSA as well as DH that does not provide Perfect Forward Secrecy (PFS).

Prior to the implementation of newer encryption techniques that guaranty Perfect Forward Secrecy (PFS), data transmitted between a server and a client could be compromised if the server's private key was disclosed. In particular, an attacker could record encrypted traffic for any amount of time and store it until such a time that they had access to the private key. Once they have access to the private key, they can decrypt all historic data. This is possible because of the way that key material is exchanged between the client and the server. During the initial handshake, the client creates something called a Pre-Master Secret. The Pre-Master Secret (PMS) is encrypted with the server's public key and sent to the server to protect it from being exposed whilst in transit. Once the server receives the PMS it can decrypt it with its own private key and then both client and server have their own copy. From this, both client and server generate the symmetric sessions keys that will be used to exchange further data, the Master Secret. Because the Pre-Master Secret is encrypted with the server's public key, exposure of the private key would allow an attacker to decrypt the data at any point in the future. This ability to decrypt historic data at any point represented and still represents quite a serious potential problem.

TLS v1.3 for example, improved these encryption techniques from the security perspective and consequently replace these authentication methods by rather using ephemeral security methods with guaranteed Perfect Forward Secrecy (PFS), where the leakage of a key used for the authentication of a given data session no longer enables an attacker to replay and decrypt other encrypted sessions.

PFS means that an encryption system automatically and frequently changes the keys it uses to encrypt and decrypt information, such as a data session, such that if the latest key is compromised, it exposes only a small portion of the sensitive data, which was encrypted using that key. Encryption tools with perfect forward secrecy switch their keys as frequently as every message in text-based conversation, every phone call in the case of encrypted calling apps, or every time a user loads or reloads an encrypted web page in his or her browser. More concretely, a public-key system has the property of forward secrecy if it generates one random secret key per session to complete a key agreement, without using a deterministic algorithm. This means, as mentioned, that the compromise of one session cannot compromise others as well, and there is no one secret value whose acquisition would compromise multiple sessions. Forward secrecy (achieved by generating new session keys for each message) ensures that past communications cannot be decrypted if one of the keys is compromised, since such a key is only used to encrypt a single message. Forward secrecy also ensures that past communications cannot be decrypted if the long-term private keys are compromised.

Hence, with Ephemeral DH/ECDH (ECDHE/DHE), the TLS server uses a different ECDHE/DHE public key for each exchange. By doing so, an attacker that has recorded the encrypted session will not be able to recover the pre-master secret and the keys.

But while such scenario significantly increases data protection, it also renders debugging or troubleshooting the encrypted data sessions more problematic if not impossible. For example, a data center gateway can no longer properly debug a problematic session as encryption keys are dropped at the termination of every data session, and without the possibility to decrypt the session's content, the debugger no longer has access to the data session content. Hence, finding an error in a problematic data session becomes impossible.

Debugging a network issue or an application issue without any means to decrypt the traffic is a problem that remains unsolved in TLS 1.3 and in other encryption methods using guaranteed PFS.

Reference is now made to FIG. 1 (Prior Art) that shows a nodal operation and signal flow diagram of a data session between a client 102 and an exemplary cloud-based datacenter 104, where the client 102 connects using an HTTP session encrypted with TLS 1.2 to the data center 104 using RSA without keyless SSL.

In action 106, the client 102 generates a client random and sends it in a Client Hello message 1. The Client Hello message 1 contains the protocol version the client 102 wants to use, and some other information to get the handshake started, including the client random and a list of cipher suites. Modern browsers also include the hostname they are looking for, called the Server Name Indication (SNI). SNI lets the web server host multiple domains on the same IP address.

In response to receiving the Client Hello message 1, action 108, and after receiving it, the server 104 picks the parameters (the server random, the server's chosen cipher suite, and the server's certificate, where the choice of cipher suite determines what type of handshake is performed) for the handshake going forward, action 110. The Server 104 responds with a Server Hello message 2, comprising the server random, the server's chosen cipher suite, and the server's certificate that itself contains the server's public key and domain name.

The client 102 receives the Server Hello message 2 in action 112, and in action 114 validates that the server's certificate is trusted and belongs to the site it is trying to reach, and creates a random pre-master secret, action 114. This secret is encrypted with the public key from the certificate and sent to the server 104 in a Client Key Exchange message 3.

Upon receiving the Client Key Exchange message 3, the server 104 uses its private key to decrypt this pre-master secret, action 116. Now that both sides have the pre-master secret, and both client and server randoms, they can both derive the same session key, actions 118-124. Then, they exchange a short message to indicate that the next message they send will be encrypted.

The handshake is officially complete when the client and server exchange "Finished" messages. The actual text is literally: "client finished" or "server finished" encrypted with the session key. Any subsequent communication between the two parties are encrypted with the session key.

This handshake is elegant because it combines key exchange and authentication in one step. The logic is that if the server can correctly derive the session key, then they must have access to the private key, and, therefore, be the owner of the certificate.

The downside of this handshake is that the messages secured by it are only as safe as the private key. If a third party has recorded the handshake and the subsequent communication, if that party gets access to the private key in the future, they will be able to decrypt the premaster secret and derive the session key. With that, they can decrypt the entire message. This is true even if the certificate is expired or revoked.

Reference is now made to FIG. 2 (Prior Art) which is another schematic illustration of a scenario with the client 102 connecting using an HTTP session encrypted with TLS 1.2 to the data 104 center, but this time using Diffie-Hellman without keyless SSL.

In action 206, the client 102 generates the client random and sends it in a Client Hello message 1. Just like in the RSA case, the Client Hello message 1 contains the protocol version, the client random, a list of cipher suites, and, optionally, the SNI extension. If the client speaks ECDHE, they include the list of curves they support.

After receiving the Client Hello message 1, the server 104, in action 208, picks the parameters for the handshake going forward, including the curve for ECDHE, action 210. The server "hello" message 2a sent contains the server random, the server's chosen cipher suite, and the server's certificate. The RSA and Diffie-Hellman handshakes start to differ at this point with a new message type.

In order to start the Diffie-Hellman key exchange, the server 104 needs to pick some starting parameters and send them to the client, computed in action 216. The server 104 also needs a way to prove that it has control of the private key, so the server computes a digital signature of all the messages up to this point, action 218. Both the Diffie-Hellman parameters and the signature are sent in the Server Key Exchange message 3.

After validating that the certificate is trusted and belongs to the site they are trying to reach, the client 104 validates the digital signature sent from the server, action 214. In action 216, the client 102 also sends to the server 104 half of the Diffie-Hellman handshake via message 4, which the server receives in action 220.

At this point, both sides can compute the pre-master secret from the Diffie-Hellman parameters, as shown in actions 222-223. With the pre-master secret both client and server randoms, they can derive the same session key, as shown in actions 224 and 226. They then exchange a short message to indicate that the next message they send will be encrypted.

Just like in the RSA handshake, this handshake is officially complete when the client and server exchange "Finished" messages. Any subsequent communication between the two parties are encrypted with the session key.

This methodology suffers from the same drawbacks as discussed hereinbefore.

However, in the latest version of TLS, namely TLS v1.3, RSA and DH authentication methods are not possible. Instead TLS1.3 uses only authentication methods that provide PFS such as elliptical ephemeral Diffie Hellman or ephemeral Diffie Hellman. With such authentication, the Diffie Hellman keys are regenerated for each key exchange which makes impossible for an attacker to retrieve the master secret and session keys from a previously recorded key exchange. In other word, these methods prevent that session keys are derived from a "long term secret" and a recorded exchange.

But while increasing the security of the data session, the renewal of the session keys based on PFS led to issues in terms of debugging and troubleshooting the sessions when errors occur. Dropping the key at the end of every session makes the key no longer available to the data center for after-session debugging. Accordingly, this prevents any further decryption of the data session, which in turn prevents any debugging or troubleshooting of the session, thus perpetuating potential problems or system instabilities.

Accordingly, it should be readily appreciated that in order to overcome the deficiencies and shortcomings of the existing solutions, it would be advantageous to have a method and system for effectively providing access to the content of a data session encrypted with ephemeral security methods with guaranteed Perfect Forward Secrecy (PFS) like TLS v1.3 while preserving the users' trust and the security of the session The present invention provides such a method and system.

SUMMARY

Methods, terminal and a data center gateway are provided for allowing efficient debugging and troubleshooting of data session encrypted with Perfect Forward Secrecy (PFS) encryption techniques such as for example, but not limited to, the Transport Layer Security (TLS) protocol version 1.3. Embodiments of the invention allow the user terminal to authorize a data center gateway to store encryption key(s) associated with the data session for use to access the recorded data session and troubleshooting it when faults are detected. When a fault is detected, the user terminal provides authorization to the gateway to persistently store the data session along with the encryption key(s). With this, the gateway allows for the data session to be later decrypted and faults to be investigated despite the data session being encrypted with PFS techniques.

In one embodiment, there is provided a method in a terminal for authorizing storage of security keys, the method allowing a terminal to detect a fault with a data session encrypted with a PFS encryption technique, the data session extending at least between the terminal and a data center gateway, and responsive to detecting the fault, to send from the terminal to the gateway a message with an authorization to authorize the data center gateway to persistently store one or more security keys associated with the data session, in view of troubleshooting the fault. The message may also comprise an indication of the fault. Detecting the fault may comprise receiving from the data center gateway information about the fault. The data session may be a Hyper Text Transfer Protocol (HTTP) data session encrypted with a Transport Layer Security (TLS) protocol version 1.3 or later.

In another embodiment, there is provided a method in a gateway for authorizing storage of one or more security keys, the allowing, responsive to detecting a fault with a data session encrypted with a PFS encryption technique, the data session extending at least between the terminal and the data center gateway, to receive a message with an authorization to authorize the data center gateway to persistently store the one or more security keys associated with the data session, in view of troubleshooting the fault; and instructing the storing of the one or more security keys associated with the data session. The message further comprises an indication of the fault. Detecting the fault may be performed by the terminal or by the data center gateway. The data session may be an HTTP data session encrypted with a TLS protocol version 1.3 or later.

In another embodiment, there is provided a terminal comprising circuitry adapted to detect a fault with a data session encrypted with a PFS encryption technique, the data session extending at least between the terminal and a data center gateway, and further adapted, responsive to detecting the fault, to send to the gateway a message with an authorization to authorize the data center gateway to persistently store one or more security keys associated with the data session, in view of troubleshooting the fault. The message may further comprise an indication of the fault. The fault may comprise receiving from the data center gateway information about the fault. The data session may be an HTTP data session encrypted with TLS protocol version 1.3 or later.

In yet another embodiment, there is provided a data center gateway comprising circuitry adapted to, responsive to detecting a fault with a data session encrypted with a PFS encryption technique, the data session extending at least between the terminal and the data center gateway, to receive a message with an authorization to authorize the data center gateway to persistently store one or more security keys associated with the data session, in view of troubleshooting the fault. The message may further comprise an indication of the fault. The fault may be performed by the data center gateway. The data session may be an HTTP data session encrypted with a TLS protocol version 1.3. or later.

In yet another embodiment, there is provided a terminal comprising a processing module adapted to detect a fault with a data session encrypted with a PFS encryption technique, the data session extending at least between the terminal and a data center gateway, and a communications module adapted to, responsive to detecting the fault, send to the gateway a message with an authorization to authorize the data center gateway to persistently store one or more security keys associated with the data session, in view of troubleshooting the fault.

In another embodiment, there is provided a data center gateway comprising a processing module adapted to detecting a fault with a data session encrypted with PFS encryption technique, the data session extending at least between the terminal and the data center gateway; and a communications module adapted to receive a message with an authorization to authorize the data center gateway to persistently store security keys associated with the data session, in view of troubleshooting the fault.

BRIEF DESCRIPTION OF THE DRAWINGS

For a more detailed understanding of the invention, for further objects and advantages thereof, reference can now be made to the following description, taken in conjunction with the accompanying drawings, in which.

DETAILED DESCRIPTION

Figure 1:
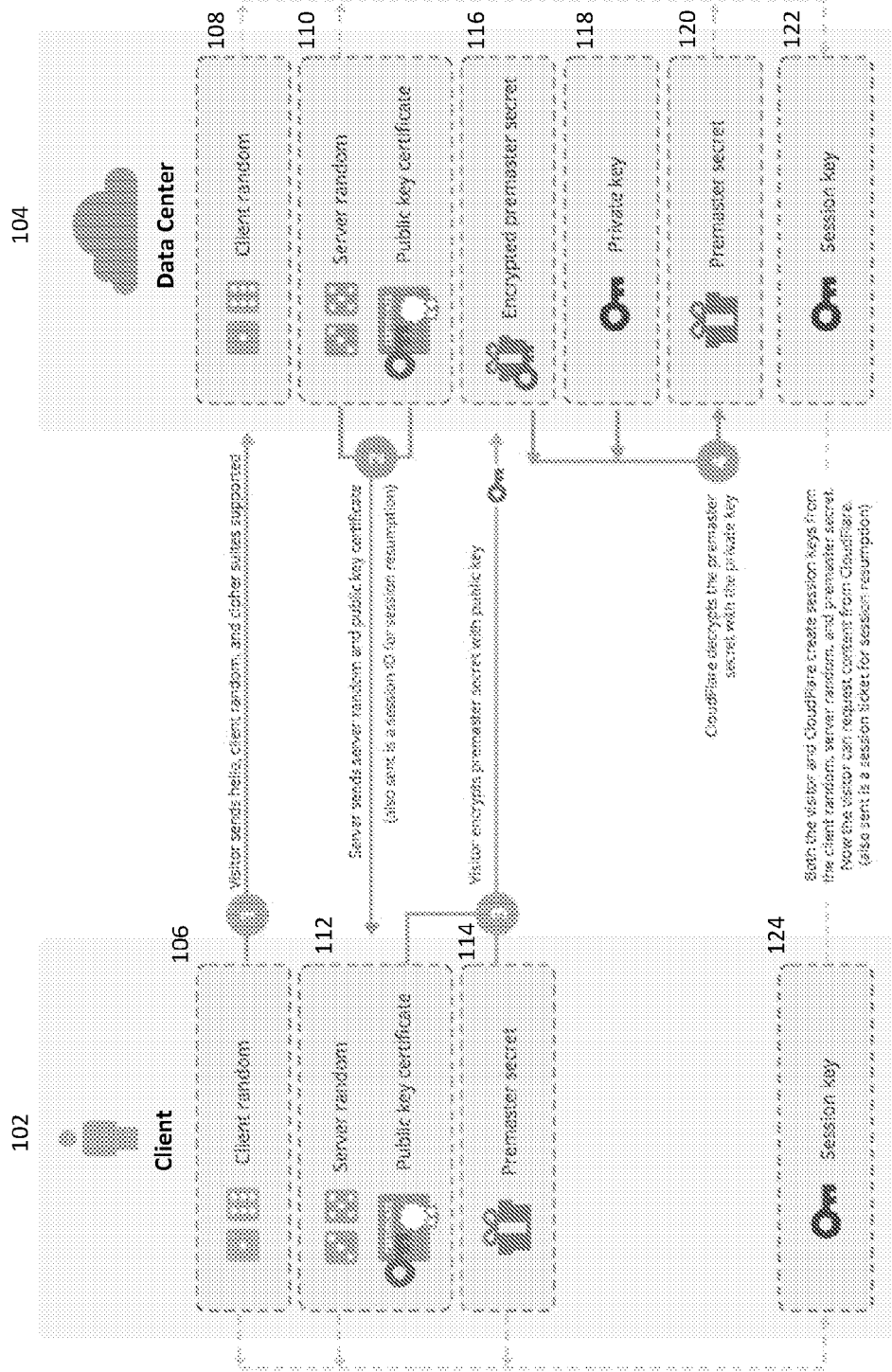
FIG. 1 (Prior Art) is a schematic illustration of a scenario with a client connecting to a data center using RSA without keyless SSL.
Figure 2:
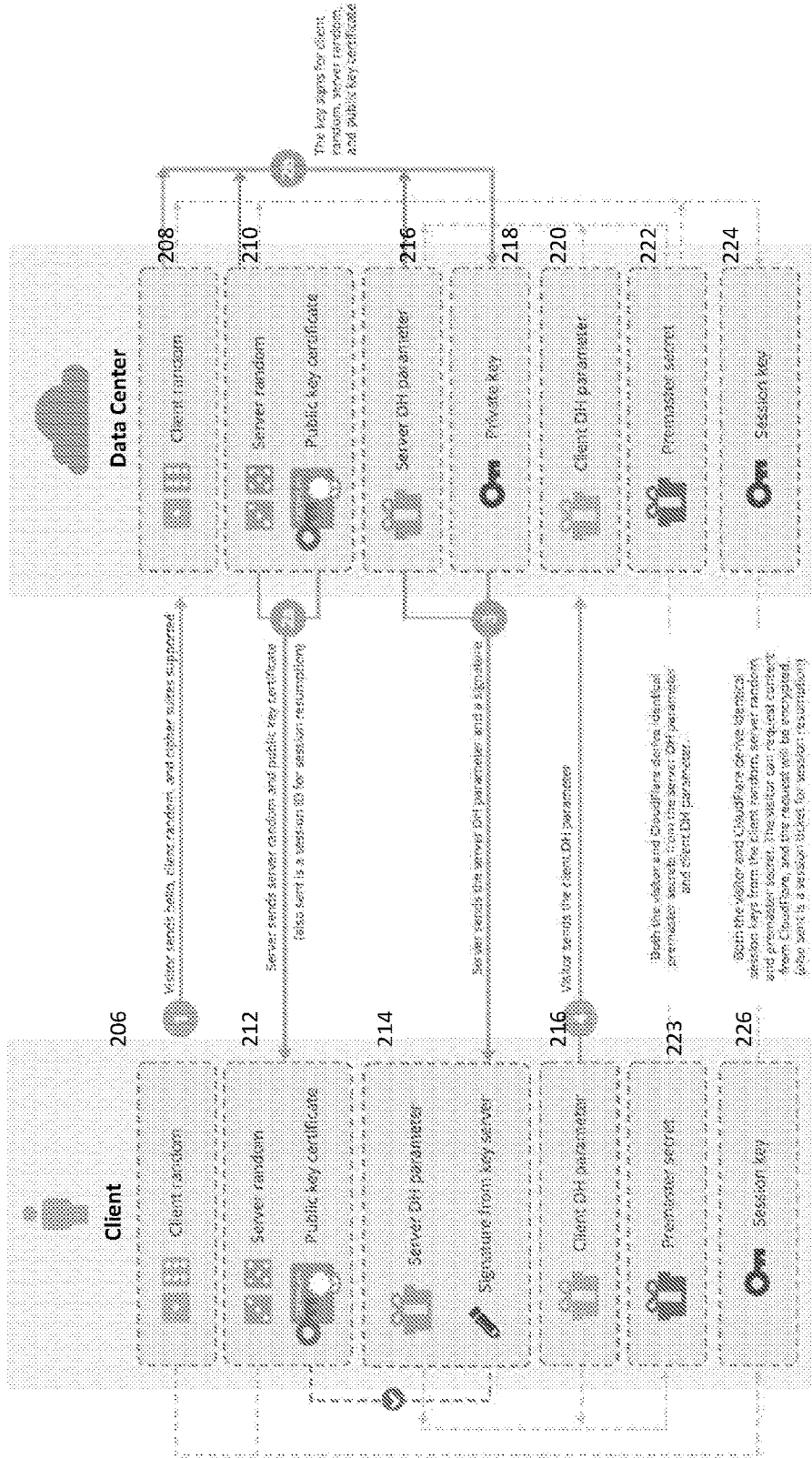
FIG. 2 (Prior Art) is another schematic illustration of a scenario with a client connecting to a data center using Diffie-Hellman without keyless SSL.

The innovative teachings of the present invention will be described with reference to various exemplary embodiments. However, it should be understood that this class of embodiments provides only a few examples of the many advantageous uses of the innovative teachings of the invention. In general, statements made in the specification of the present application do not necessarily limit any of the various claimed aspects of the present invention. Moreover, some statements may apply to some inventive features but not to others. In the drawings, like or similar elements are designated with identical reference numerals throughout the several views.

Web applications are deployed more and more in a cloud environment. At the same time, more and more users have privacy concerns and thus demand and use secure connections, e.g. HTTPS (HTTP sessions encrypted with TLS) to connect to these web applications. However, the usage of secure connections makes it harder and harder if not impossible for the technical support stuff of the data centers to read and verify the connections between the end users and web applications for the cloud providers. Additionally, to accelerate and offload the web applications (practically for offering new services), the cloud providers want to deploy gateways before the web applications. Thus, many of the bugs and debugging needs take place in the gateways deployed between web applications and the end-users. Today, there is no solution to address this with encrypted connections allowing a Perfect Forward Secrecy, such as for example with TLS 1.3 or other such ephemeral security techniques.

Present embodiments allow the troubleshooting of data sessions even in such situations for data sessions encrypted with PFS techniques. Therefore, present solutions help provide better reliability for the gateway solutions deployed in the cloud hosting web applications.

Present embodiments enable an end user to authorize the data center provider to record one or more encryption key(s) (also called herein security keys) for after-session troubleshooting and debugging. This may be achieved by having the end user authorize such persistent storage. For example, when encountering an issue, the user may mention using e.g. an HTTP header Option that the current HTTP request is part of a debugging effort. Optionally, the HTTP Option may carry some further reference to a faulty, specific issue, such as for example, a fault number or ID. Upon receiving this message, a data center gateway may export and persistently store the one ore more security keys, i.e. all or part of the necessary cryptographic material used for the data session, which contains the session key(s) necessary to decrypt the encrypted session. These key(s) are not public values and are part of the internal state of e.g. a TLS client and servers. The data session can thus be stored encrypted and later be decrypted by e.g. a cloud datacenter provider administrator for troubleshooting the session.

Present embodiments provide a mechanism that enables an end user who encounters an issue to report it to a datacenter provider administrator and to allow for the provision of the necessary information for the cloud data center provider to decrypt the various flows in an effort to troubleshoot the issue. Present solutions are expected to ease the communication from the end user to the cloud data center provider, with or without a customer support hotline. The proposed mechanism does not alter the security of the encryption, as the data session remains encrypted for its entire duration, and user authorization is specifically required for post-session recording and/or debugging.

Further embodiments of the inventions propose a new HTTP troubleshooting mode, herein called HTTP Request Troubleshooting (RTS) mode. This mode may be activated by a web administrator, the end-user itself, an OSS/BSS software upon detection of a trouble, or by a software agent using analytics or other mechanisms, but always requires the end-user approval for the storage of the encryption keys. For example, the end-user encounters an issue while trying to connect to the website of her bank and calls the hotline that concludes there is a need for further investigation. The hotline assigns the user a number issue 123456789 and the user is required to authorize the storage of the one or more security session keys enabling post-session decryption and debugging.

Figure 3:
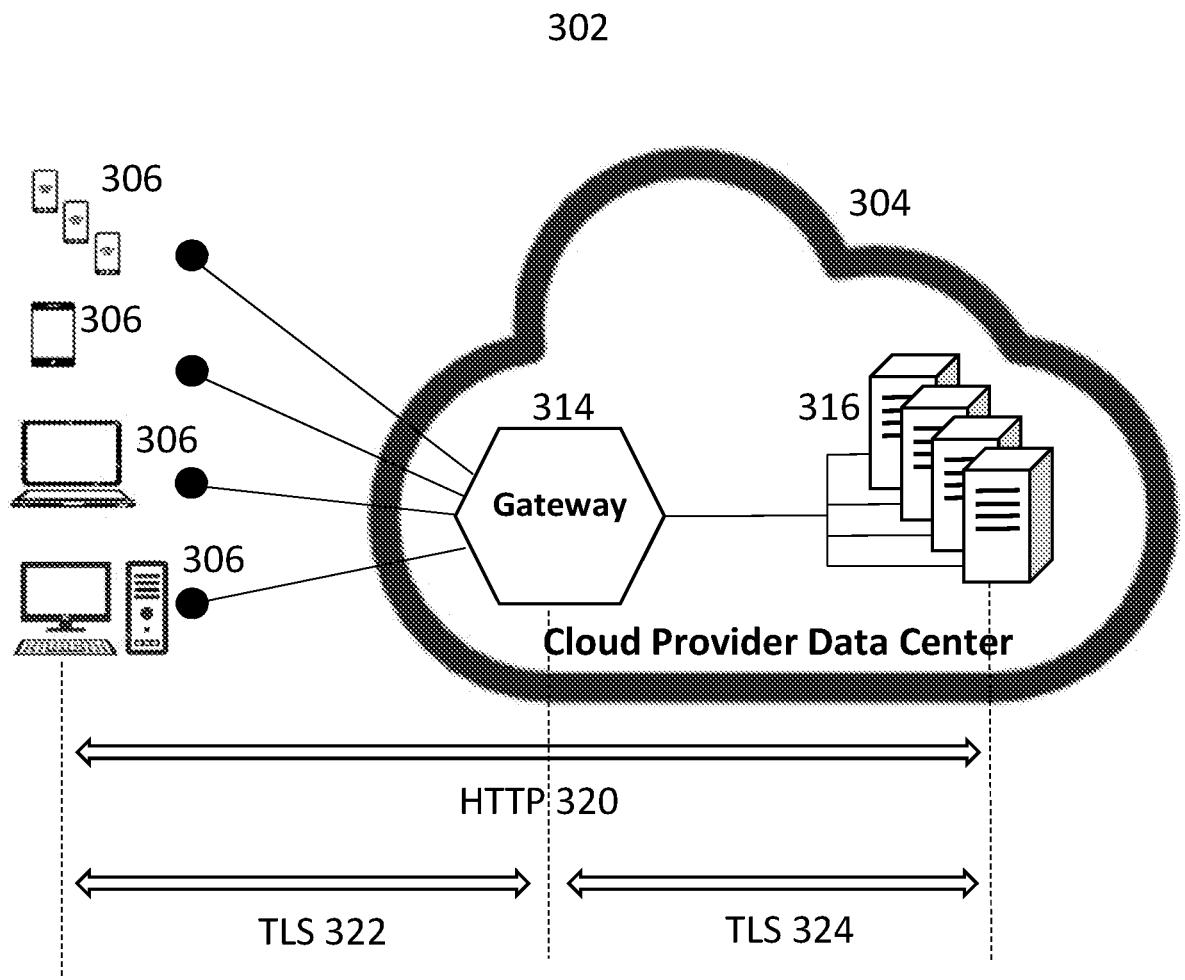
FIG. 3 is an illustration of a network implementing an exemplary embodiment of the invention.

Reference is now made to FIG. 3 showing an illustration of an exemplary communications network 302 implementing an embodiment of the invention.

Shown in FIG. 3 are exemplary terminals 306, such as for example mobile phones, connected tablets, laptops, computers, or any other types of terminals connected via the internet (not shown) to an exemplary cloud data center 304. When the user connects by any one of the terminals 306 to the data center 304, typically an HTTP session 320 is created end to end, that is between the terminal 306 and a server 316. Such server may, for example store applications, such as for example banking or other type of services applications. In order to have security over the data sessions established over HTTP, TLS or another security protocol may be used as a means to encrypt the data exchange over the data session 320 and in so doing to ensure its privacy and confidentiality. If TLS over HTTP is used, the typical way is that a first TLS session 322 encrypts the portion of the HTTP session 320 extending between the terminal 306 and a data center gateway 314, which is the entry point in the data center domain. A second TLS session 324 further encrypts data exchange between the gateway 314 and the data center 316. In the exemplary scenario shown in FIG. 3, TLS 1.3 is used for the TLS sessions 322 and 324, where the encryption keys (also called security keys) are discarded at the end of the session 320.

Figure 4:
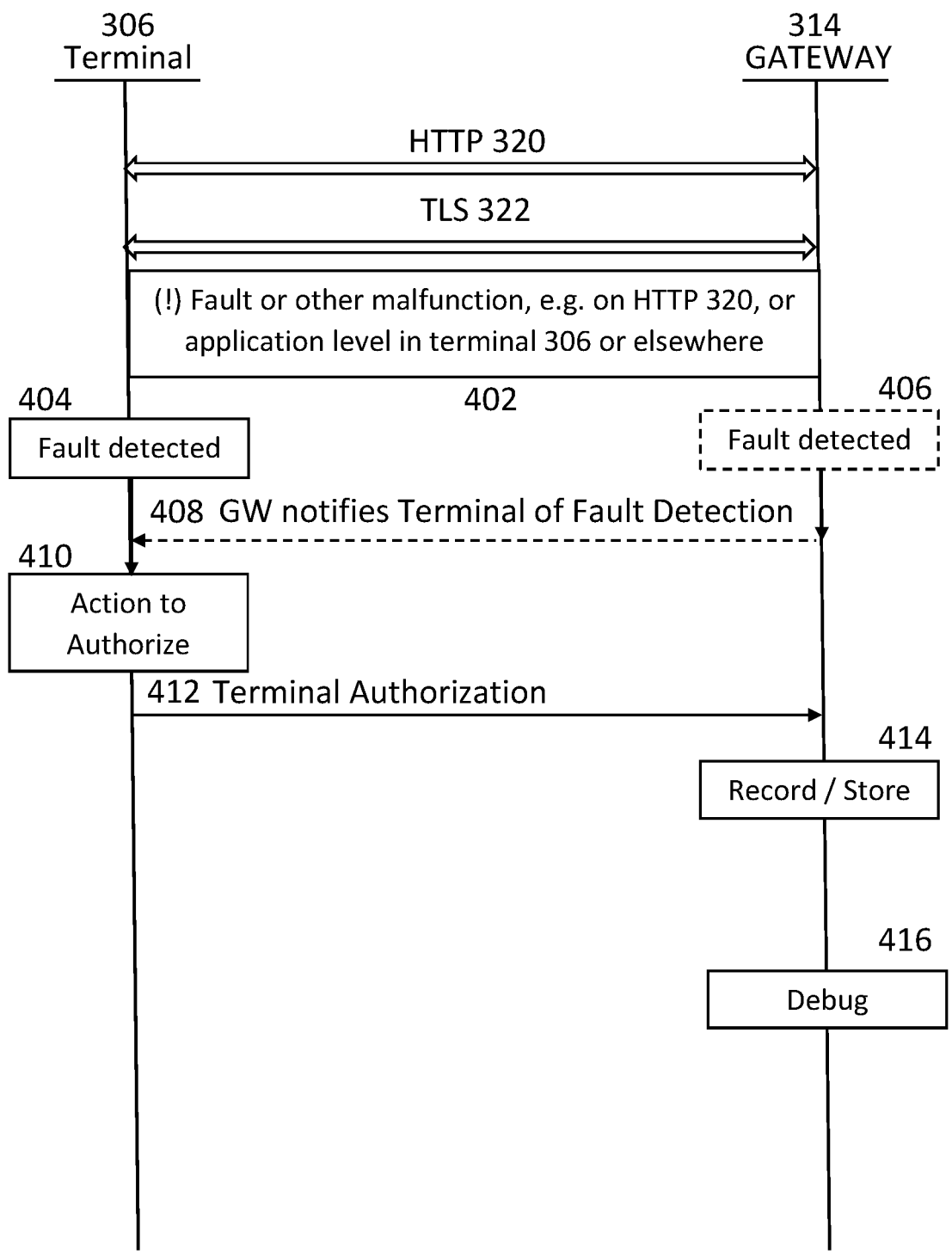
FIG. 4 is a nodal operation and signal flow diagram of another exemplary embodiment of the invention.

Reference is now made to FIG. 4 showing a nodal operation and signal flow diagram of an embodiment of the invention and jointly to FIG. 3 previously described. Shown in FIG. 4 is terminal 306 and the data center gateway 314 as previously described with the HTTP session 320 extending therebetween and the TLS 1.3. security session 322 encrypting the data exchanged on the HTTP session between the terminal 306 and the gateway 314.

In action 402, a certain fault occurs in relation to the HTTP data session 320 or the TLS session 322. Typically, when such error occurs it is noticeable by the user of the data session because, for example, the data transfer I stalled or the session crashes altogether.

According to certain embodiments, the fault may be detected at the terminal side, action 404. This action may be performed automatically, e.g. with the terminal 306 being configured to detect faults in relation to its communications sessions. Alternatively, such fault may be noticed by the user of the terminal 306. For example, the user of the terminal 306 may become aware of a certain fault during the data session and react upon such occurrence.

Alternatively, in certain other embodiments, the data session fault may be first detected by the datacenter 304 side, i.e. either by the gateway 314 (or some functionality associated therewith) or the server 316, action 406, then reported to the client 306 in action 408, where the gateway 314 notifies the terminal 306 of the detection of the fault.

Either ways, when the client terminal 306 becomes aware of the fault, in action 410, the terminal begins the process to authorize the datacenter 304 to troubleshoot the data session in order to solve or identify the fault, or to store the security keys associated therewith for later debugging or troubleshooting. To this end, the user may select a certain menu in the HTTP page, e.g. by clicking or pressing on a "Request Troubleshooting" icon displayed in its browser, and possibly also entering or generating a fault number issue. By pressing "Request Troubleshooting", the web browser may insert a NEW HTTP Header X-Request-Trouble-Shooting: <Issue-Type>: <Text>, a dedicated troubleshooting request functionality. Such header may be composed of the issue type and a text field. The text field may be filled with the issue number. As an exemplary approach, the issue number may be assigned to the user through a help line interaction, automatically by a software agent, or web admin. These fields will later enable the automatic binding of the session with the fault at the gateway 314 side.

Same or analogous actions may be configured to be performed automatically by the terminal 306. For example, action 410 to issue the authorization may be automated.

In action 412, the message with the authorization is sent from the terminal 306 to the gateway 314. Such authorization may include, explicitly or implicitly, authorization to persistently store the encryption keys so that the datacenter 304 may have access to the data session content after the termination of the data session.

In many current cloud datacenter architectures, the gateway 314 decrypts the TLS sessions on behalf of the applications running on servers 316. Upon receiving the traffic, the gateway 314 acts as a TLS termination point and ends the TLS session 322 of the end user terminal 306.

Thus, upon receipt of message 412, the gateway 314 acts to store, action 414 one or more security keys associated with the session 322, which enables debuggers and network administrators to have access to the session content even after the session is terminated, in order to perform debugging and troubleshooting.

If the HTTP header is used, according to certain embodiments, gateway 314 inspects the HTTP Headers to find the HTTP Header X-Request-Trouble-Shooting. If the Header is present, the gateway 314 may optionally check if the elements meet certain criteria, such as for example checking the "Issue-Type" and/or checking if the Issue ID is already among the registered claims. When a matching occurs between the X-Request-Trouble-Shooting and the cloud provider policies, the gateway 314 persistently stores the corresponding TLS material as well as the parameters of the X-Request-Trouble-Shooting parameters, action 414.

The gateway 314 may also export the one or more encryption keys to a third party to store it for further debugging in the future. The session keys are stored to be used later for the debugging and troubleshooting of the data traffic between terminal 306 and the gateway 314.

According to certain further embodiments, as there may exist many simultaneous sessions between different users and terminal 306 and the gateway 314, to be able to distinguish between different sessions at different times, the TLS crypto material including he security keys may also be mapped into a tuple.

Such a tuple may for example comprise the following elements:
Source IP: In order to be able to distinguish between sessions from different terminals 306 the Source IP is mapped into crypto info.
Destination IP: in case there are several IP addresses are used for the application, there is a need to keep what destination IP address was used.
Source Port and Destination Port: in case the terminal is a proxy gateway deploying a NAT solution, or several applications from same Source IP are connected to the GW using different ports, there is a need to distinguish between different terminals behind the proxy gateway deploying a NAT. Keeping the port number would allow to do so.
Start time: when the same terminal connects to the GW at different times, it would be assigned different session keys for different sessions over time. Therefore, there is a need to keep different start times corresponding to different Keys. Note that if RTS header is set, if there is a new session established from the client, the GW 314 would automatically store each new set of crypto material, e.g. session key, with start time.

In action 416, the stored crypto material including the security keys that were stored, may be used, after the data session termination in order to decrypt and access the session content in order to debug and troubleshoot the fault of step 402. This is in line with the authorization provided in actions 410-412.

Figure 5:
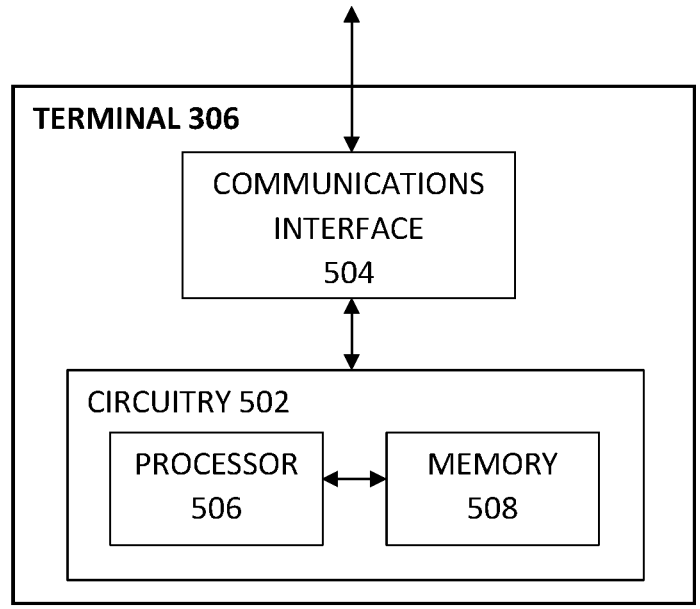
FIG. 5 is a block diagram of yet another exemplary embodiment of the invention.

Reference is now made to FIG. 5 showing a block diagram of another exemplary embodiment of the invention. In FIG. 5 there is shown the same terminal 306 according to some embodiments. Terminal 306 may comprise a communication interface 504 responsible for handling incoming and outgoing communication, on behalf of the terminal 306 as shown and previously described in FIGS. 3 and 4. The communication interface 504 is in connection with a circuitry 502 which is responsible for performing the actions shown and described hereinbefore in relation to FIGS. 3 and 4, including participating in establishing the HTTP session 320 and the TLS session 322, detecting the fault in action 404 or being informed of the fault detection via the message 408, and the action 410 to authorize the persistent storage of the security keys and the transmission of the authorization of action 412. In a further embodiment, the circuitry 502 may comprise a processor 506 and a memory 508, where the memory includes instructions that when executed by the processor 502 cause the terminal 306 to perform the previously described actions.

Figure 6:
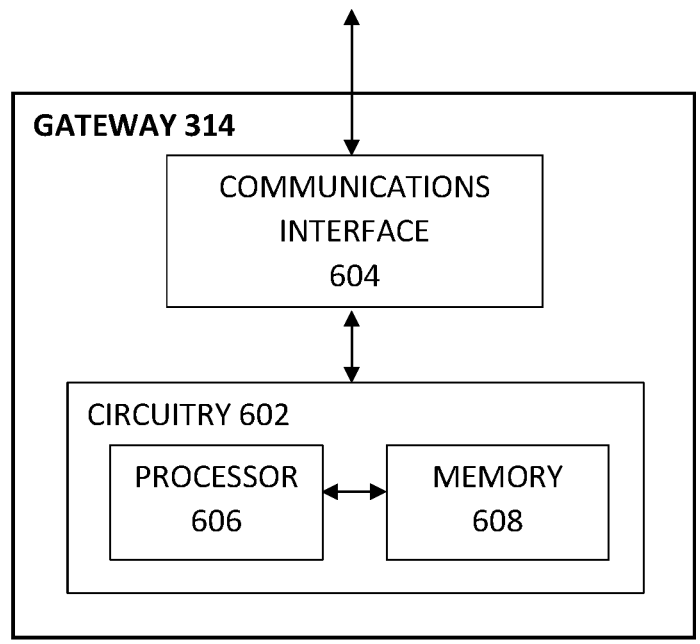
FIG. 6 is a block diagram of yet another exemplary embodiment of the invention.

Reference is now made to FIG. 6 showing a block diagram of another exemplary embodiment. Shown in FIG. 6 is the gateway 314 including a communications interface 604 responsible for exchanging incoming and outgoing messages on behalf of the gateway 314. The communication interface 604 is in communication with the circuitry 602 which is responsible for performing the actions described for the gateway 314 in FIGS. 3 and 4, including participating in the establishment of the HTTP session 320 and the TLS session 322, for detecting the fault in action 406 and informing the terminal 306 in action 408 of the fault detection and for receiving the authorization in action in 412 based on which it can store the security keys in action 414. Finally, the gateway 314 may also be responsible of some action in relation to the debugging or the troubleshooting of the session shown in action 416, as described hereinbefore. In a certain embodiment the circuitry 602 may comprise a processor 606 in communication with the memory 608, where in the memory includes instructions that when executed by the processor 606 cause the gateway 314 to perform the previously described actions.

Figure 7:
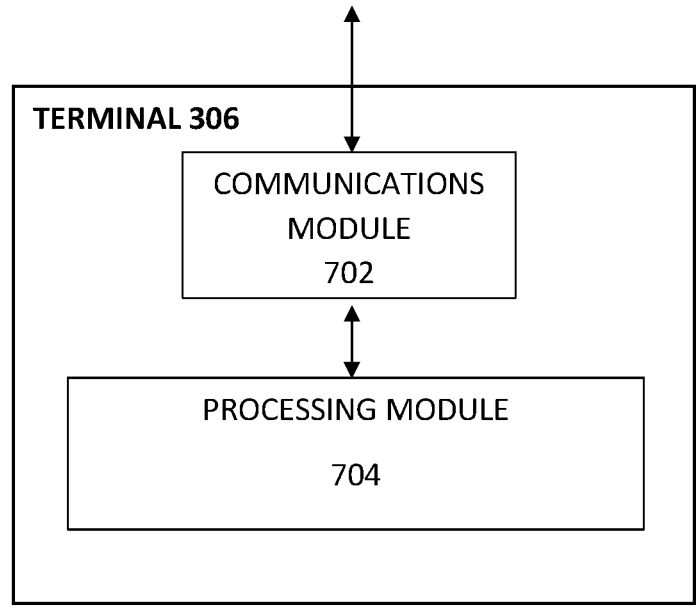
FIG. 7 is a functional diagram of another embodiment of the invention.

Reference is now made to FIG. 7 showing a functional diagram of another embodiment of the invention. Shown therein is the same terminal 306 according to a different embodiment, where the terminal 306 includes a communication module 702 and a processing module 704. The communication module 702 is responsible for receiving or sending the messages exchanged by the terminals 306, as shown and described in FIGS. 3 and 4. The processing module 704 is responsible for performing the actions shown in FIG. 4 in particular, including but not limited to the detection of the fault in action 404 or the action to authorize the persistent storage of the security keys as shown in action 410.

Figure 8:
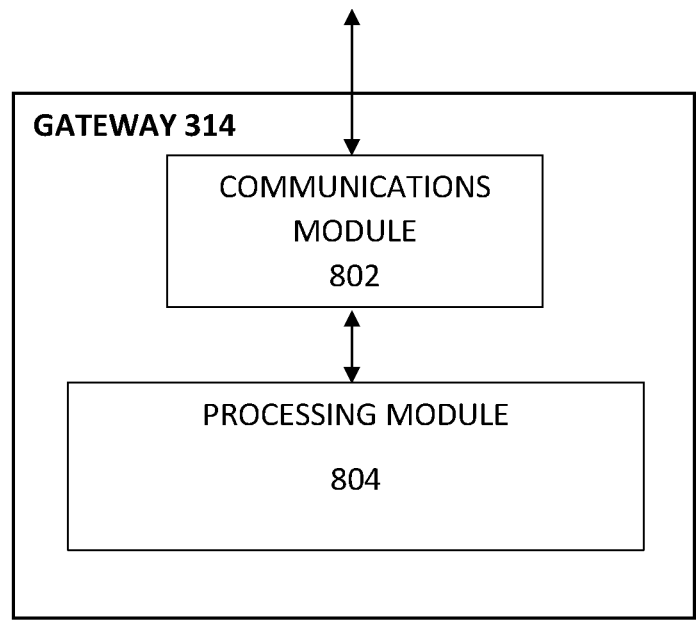
FIG. 8 is another functional diagram of yet another embodiment of the invention.

Reference is now made to FIG. 8 showing another functional diagram of another embodiment of the invention. Shown in FIG. 8 is the gateway 314 including a communications module 802 and a processing module 804. The communications module 802 is responsible for the exchange of messages by the gateway 314 as shown in FIGS. 3 and 4. The processing module 804 is responsible for action 406 in which the gateway detects the fault in relation with the session, and of the storage of the security keys, as shown in action 414, and optionally of action 416 in relation to the troubleshooting and the debugging.

Based upon the foregoing, it should now be apparent to those of ordinary skills in the art that the present invention provides an advantageous solution. It should be realized upon reference hereto that the innovative teachings contained herein are not necessarily limited thereto and may be implemented advantageously with any applicable telecommunications standard. It is believed that the operation and construction of the present invention will be apparent from the foregoing description. While the method and system shown and described have been characterized as being preferred, it will be readily apparent that various changes and modifications could be made therein without departing from the scope of the invention as defined by the claims set forth hereinbelow.

Although several preferred embodiments of the method and system of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

The invention claimed is:

1. A method in a terminal for authorizing storage of security keys, the method comprising:
   detecting by the terminal a fault with a data session encrypted with a Perfect Forward Secrecy (PFS) encryption technique, the data session extending at least between the terminal and a data center gateway;
   obtaining an authorization for storing the security keys, the obtaining triggered by the detected fault with the data session encrypted with the PFS encryption technique; and
   responsive to detecting the fault, sending from the terminal to the gateway a message with the authorization to authorize the data center gateway to persistently store one or more security keys associated with the data session, in view of troubleshooting the fault.

2. The method of claim 1, wherein the message further comprises an indication of the fault.

3. The method of claim 1, wherein the step of detecting the fault comprises receiving from the data center gateway information about the fault.

4. The method of claim 1, wherein the data session is a Hyper Text Transfer Protocol (HTTP) data session encrypted with a Transport Layer Security (TLS) protocol.

5. A method in a gateway for authorizing storage of security keys, the method comprising:
   responsive to detecting a fault with a data session encrypted with a Perfect Forward Secrecy (PFS) encryption technique, the data session extending at least between the terminal and the data center gateway, receiving a message with an authorization to authorize the data center gateway to persistently store one or more security keys associated with the data session, in view of troubleshooting the fault with the data session encrypted with the PFS encryption technique;
   instructing the storing of the security key associated with the data session; and
   storing the security keys based on the received authorization.

6. The method of claim 5, wherein the message further comprises an indication of the fault.

7. The method of claim 5, wherein detecting the fault is performed by the terminal.

8. The method of claim 5, wherein detecting the fault is performed by the data center gateway.

9. The method of claim 5, wherein the data session is a Hyper Text Transfer Protocol (HTTP) data session encrypted with a Transport Layer Security (TLS) protocol.

10. A terminal comprising circuitry configured to:
    authorize storage of security keys;
    detect a fault with a data session encrypted with a Perfect Forward Secrecy (PFS) encryption technique, the data session extending at least between the terminal and a data center gateway;
    obtain an authorization for storing the security keys, the obtaining triggered by the detected fault with the data session encrypted with the PFS encryption technique; and
    responsive to detecting the fault, send to the gateway a message with the authorization to authorize the data center gateway to persistently store one or more security keys associated with the data session, in view of troubleshooting the fault.

11. The terminal of claim 10, wherein the message further comprises an indication of the fault.

12. The terminal of claim 10, wherein the detecting the fault comprises receiving from the data center gateway information about the fault.

13. The terminal of claim 10, wherein the data session is a Hyper Text Transfer Protocol (HTTP) data session encrypted with a Transport Layer Security protocol.

14. A data center gateway comprising circuitry configured to:
    authorize storage of security keys responsive to detecting a fault with a data session encrypted with a Perfect Forward Secrecy (PFS) encryption technique, the data session extending at least between the terminal and the data center gateway, receive a message with an authorization to authorize the data center gateway to persistently store one or more security keys associated with the data session, in view of troubleshooting the fault with the data session encrypted with the PFS encryption technique; and
    store the security keys based on the received user authorization.

15. The data center gateway of claim 14, wherein the message further comprises an indication of the fault.

16. The data center gateway of claim 14, wherein detecting the fault is performed by the data center gateway.

17. The data center gateway of claim 14, wherein the data session is a Hyper Text Transfer Protocol (HTTP) data session encrypted with a Transport Layer Security (TLS) protocol.

* * * * *